US009683186B2

(12) United States Patent
Roshau et al.

(10) Patent No.: US 9,683,186 B2
(45) Date of Patent: Jun. 20, 2017

(54) CARPET PELLET MACHINE (71) Applicant: C-Power Tech, LLC, Hillsboro, OR (US)

(72) Inventors: David Roshau, Eugene, OR (US); Charles Jones, Hillsboro, OR (US)

(*) Notice: Subject to any disclaimer, the term of this patent is extended or adjusted under 35 U.S.C. 154(b) by 0 days.

(21) Appl. No.: 14/292,879

(22) Filed: May 31, 2014

(65) Prior Publication Data

US 2014/0353870 A1 Dec. 4, 2014

Related U.S. Application Data

(60) Provisional application No. 61/829,784, filed on May 31, 2013.

(51) Int. Cl.
| | |
|---|---|
| *B29B 17/00* | (2006.01) |
| *C10L 5/06* | (2006.01) |
| *C10L 5/36* | (2006.01) |
| *B29C 43/52* | (2006.01) |
| *C10L 5/26* | (2006.01) |
| *B29C 43/00* | (2006.01) |
| *B29C 43/34* | (2006.01) |
| *B29L 31/20* | (2006.01) |
| *B29K 105/00* | (2006.01) |
| *B29K 105/26* | (2006.01) |

(52) U.S. Cl.
CPC ............. *C10L 5/26* (2013.01); *B29C 43/006* (2013.01); *B29C 43/52* (2013.01); *C10L 5/06* (2013.01); *C10L 5/363* (2013.01); *B29B 17/0026* (2013.01); *B29C 2043/3444* (2013.01); *B29K 2105/251* (2013.01); *B29K 2105/26* (2013.01); *B29L 2031/20* (2013.01); *Y02E 50/30* (2013.01); *Y02W 30/62* (2015.05)

(58) Field of Classification Search
None
See application file for complete search history.

(56) References Cited

U.S. PATENT DOCUMENTS

| | | | | | |
|---|---|---|---|---|---|
| 3,706,540 | A | * | 12/1972 | Stanton | B30B 11/265 44/535 |
| 3,827,213 | A | * | 8/1974 | Matzinger | B29B 17/0026 100/179 |
| 5,413,746 | A | * | 5/1995 | Birjukov | B27N 3/28 264/109 |
| 5,468,436 | A | * | 11/1995 | Kirtland | B29B 17/0036 264/112 |
| 5,972,262 | A | * | 10/1999 | Huber | B27N 3/086 264/120 |
| 8,201,496 | B1 | * | 6/2012 | Tersteeg | B30B 11/227 100/178 |
| 2005/0104254 | A1 | * | 5/2005 | Hall | B29B 17/0036 264/324 |

(Continued)

Primary Examiner — Mary F Theisen
(74) Attorney, Agent, or Firm — Forrest Law Office, P.C.

(57) ABSTRACT

A carpet pellet machine and method are disclosed. One embodiment provides an apparatus comprising a compressor to receive fibrous material and compress the fibrous material, a mold pipe system to receive compressed fibrous material from the compressor, wherein the compressor is configured to press the fibrous material through the mold pipe system, and a heat chamber to heat the fibrous material within the mold pipe system and create an encapsulation layer on the fibrous material.

12 Claims, 10 Drawing Sheets

(56) References Cited

U.S. PATENT DOCUMENTS

| | | | |
|---|---|---|---|
| 2005/0109226 A1* | 5/2005 | Schroeder | B30B 9/062 100/233 |
| 2012/0042793 A1* | 2/2012 | Murray | B30B 7/04 100/39 |
| 2012/0245257 A1* | 9/2012 | Fascio | B29B 9/12 524/35 |
| 2014/0007783 A1* | 1/2014 | Scheeres | B29B 17/0026 100/37 |

* cited by examiner

CARPET PELLET MACHINE

RELATED APPLICATIONS

This application claims the benefit of U.S. Provisional Application No. 61/829,784, filed May 31, 2013.

BACKGROUND

Field of the Invention

The invention relates to processing shredded materials into pellets and more specifically to a machine and method for processing shredded carpet fibers into fuel pellets.

Prior Art

Discarded carpet contributes a significant amount of waste to landfills. Compounding this problem is a variation in carpet construction where some carpet is considerably more difficult to recycle. Research has shown that refuse carpet may be used as a fuel source, but has also shown detriments in transportation costs, processing variations, and handling difficulties.

SUMMARY

An improved method and apparatus for bonding fibrous material such as shredded carpet fiber is described below in the Detailed Description. One embodiment provides an apparatus comprising a compressor to receive fibrous material and compress the fibrous material, a mold pipe system to receive compressed fibrous material from the compressor, wherein the compressor is configured to press the fibrous material through the mold pipe system, and a heat chamber to heat the fibrous material within the mold pipe system and create an encapsulation layer on the fibrous material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
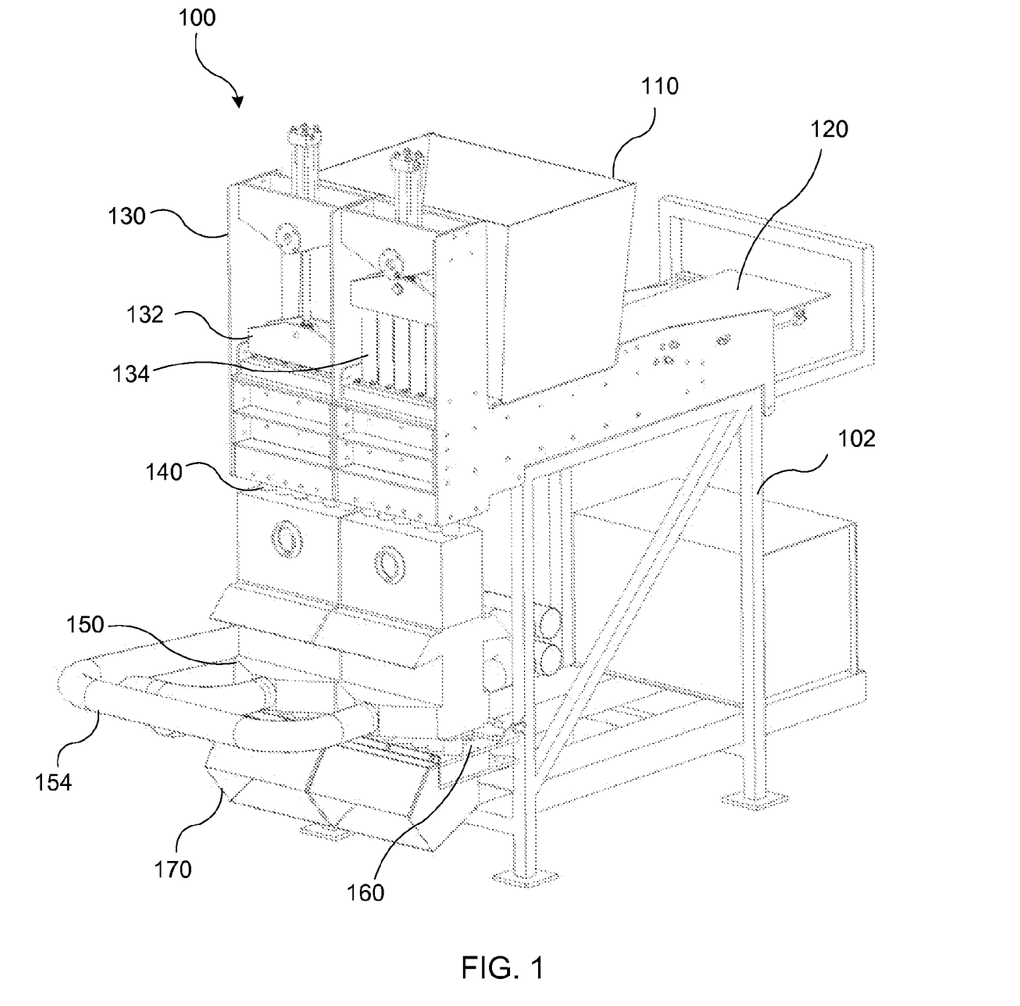
FIG. 1 is a perspective view of an example embodiment of a carpet pellet machine.

FIG. 1 is a perspective view of one embodiment of a carpet pellet machine 100. In the illustrated example, Carpet pellet machine 100 includes a hopper 110 to receive fibrous and other material. For examples, hopper 110 may receive shredded carpet or shredded carpet mixed with other materials such as shredded plastic, carpet backing, calcium carbonate, etc. Hopper 110 feeds the fibrous material to compactor 120. Compactor 120 compacts the fibrous material and feeds it to a compressor, for example a compression ram 130, by compacting the fibrous material into a small volume bounded by a mold pipe system 140 and one or more compression rams 130. In some embodiments, compactor 120 may have a plurality of compactors. In this embodiment the components of carpet pellet machine 100 reside on a frame 102, but other embodiments are not so limited and may reside on one or more additional supporting structures, be stand-alone units, modular mountable units, etc.

Compression ram 130 receives compacted fibrous material and compresses the fibrous material into a mold pipe 140. In the embodiment illustrated in FIG. 1, compression ram 130 has two ram heads 132 that each have a plurality of ram rods 134 that push the compacted fibrous material into mold pipe system 140. For example, mold pipe system 140 may have one or a plurality of pipes and compression ram 130 may have a ram rod corresponding to each pipe. Other embodiments may use more than one ram rod per pipe or may use a different mechanism to compress the compacted fibrous material into the mold pipe system 140.

In some embodiments, mold pipe system 140 then channels fibrous material over a heat source. For example, compression ram 130 may continue to feed fibrous material through mold pipe system 140 and therefore create a flow of fibrous material through the mold pipe system. Within the mold pipe system 140, the fibrous material passes through a heating chamber 150 to heat the outside of one or more pipes in mold pipe system 140. Within the heating chamber 150, the fibrous material is subject to enough heat to cause the fibrous material in contact with the pipe(s) to bond together. For example, the fibrous material may form an outer encapsulation layer such as a melted membrane that bonds the compressed fibrous material together.

Figure 2:
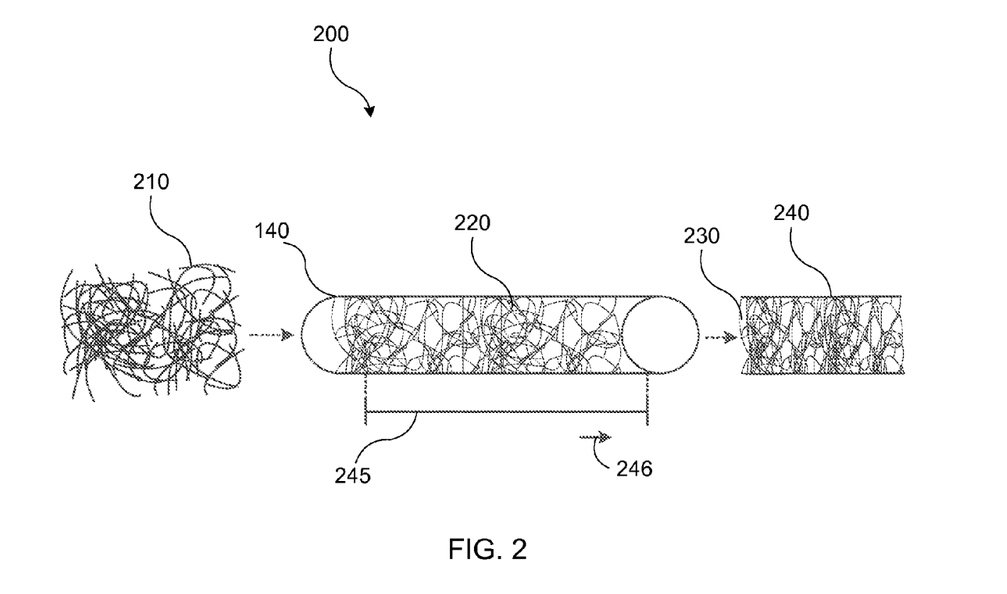
FIG. 2 shows a process to create bonded carpet material from shredded carpet fiber by compressing it through a heated mold pipe.

Referring to sequential steps 200 of an embodiment process in FIG. 2, fibrous material 210, such as shredded carpet fibers and/or other material, is compacted and fed through mold pipe system 140. Within mold pipe system 140, the fibrous material 220 is compressed together and pushing against the interior wall of one or more pipes in mold pipe system 140. As the fibrous material passes through mold pipe system 140, the outside of the pipe is heated. Enough heat is conducted through the pipe to melt the outer layer of fibrous material to create an encapsulation layer 240 or a membrane that bonds the fibrous material 230 together. In some embodiments the encapsulation layer 240 creates a continuous melted membrane around the outer circumference of bonded fibrous material 230, but other embodiments are not so limited and the fibrous material can be bonded together with a membrane that partially covers the bonded fibrous material 230.

With reference to FIG. 2, the depth of encapsulation layer 240 may be controlled by the length 245 of the heated section of mold pipe system, by the rate 246 that the fibrous material is fed through the mold pipe system 140, by the amount of heat added to the mold pipe system, by any combination of these factors or by additional methods. In this way the encapsulation layer 240 may be adjusted for particular uses of the processed bonded fibrous materials. Additionally, these factors provide control to create an encapsulation layer 240 for a range of compositions of fibrous material.

In the illustrated embodiment 100, bonded fibrous material then exits the heating chamber 150 and passes through a sizer 160 that sizes the bonded fibrous material into segments. Some embodiments may operate without a sizer 160 and generate unsegmented bonded fibrous material. Bonded fibrous material then exits carpet pellet machine 100 through an exit hopper 170.

In some embodiments an additive may be added to the fibrous material. For example, the additive may increase or decrease the heat energy generated by burning the bonded fibrous material. In some embodiments the additive may be a sugar, biomass, plastic, straw, or other combustible materials that adjust the heat energy of the resulting bonded fibrous material. In some embodiments the additive may be added to the fibrous material prior to entering the heat chamber, but other embodiments are not so limited. For example, an additive may be added within the heat chamber or after the heat chamber. In some embodiments the additive may also function as a binder to bind the fibrous material together.

Figure 3:
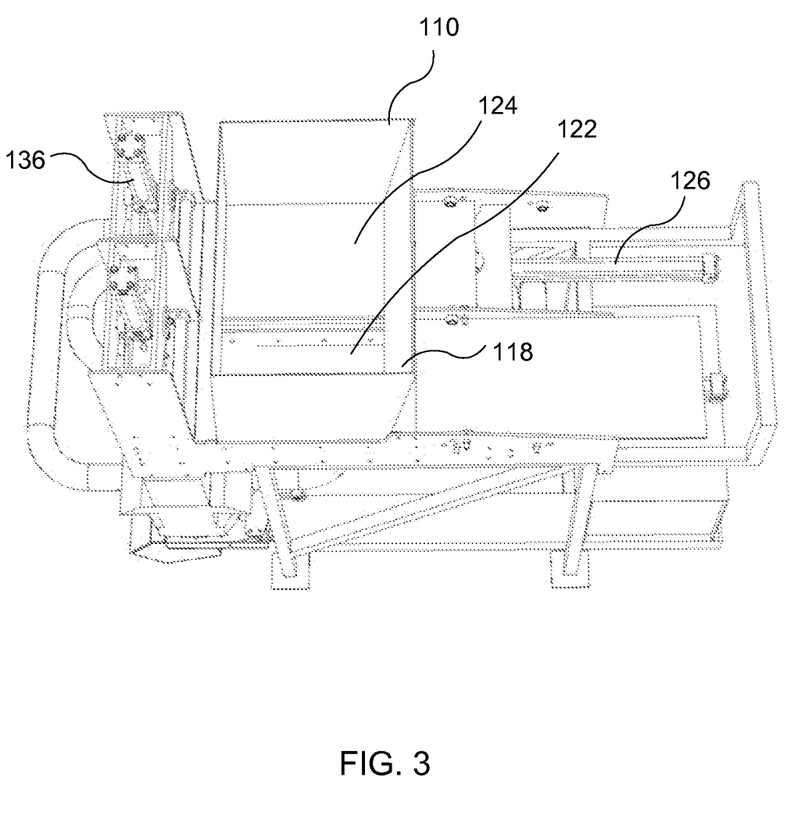
FIG. 3 is a top perspective view of an embodiment carpet pellet machine.

FIG. 3 is a top perspective view of one embodiment of a carpet pellet machine including a hopper 110. In this embodiment, hopper 110 is a vertical feed hopper with a sloped wall 118 and a hopper bottom 124 to assist in feeding fibrous material to compactor 120. Other embodiments may use a horizontal feed hopper. Additionally, other embodiments may use a plurality of sloped or contoured walls, no sloped walls, or a different geometry hopper. In some embodiments, hopper 110 may include a stir or a sweeping mechanism to assist in feeding fibrous material, to keep fibrous material separated and combat bridging of fibrous material, etc.

Figure 4:
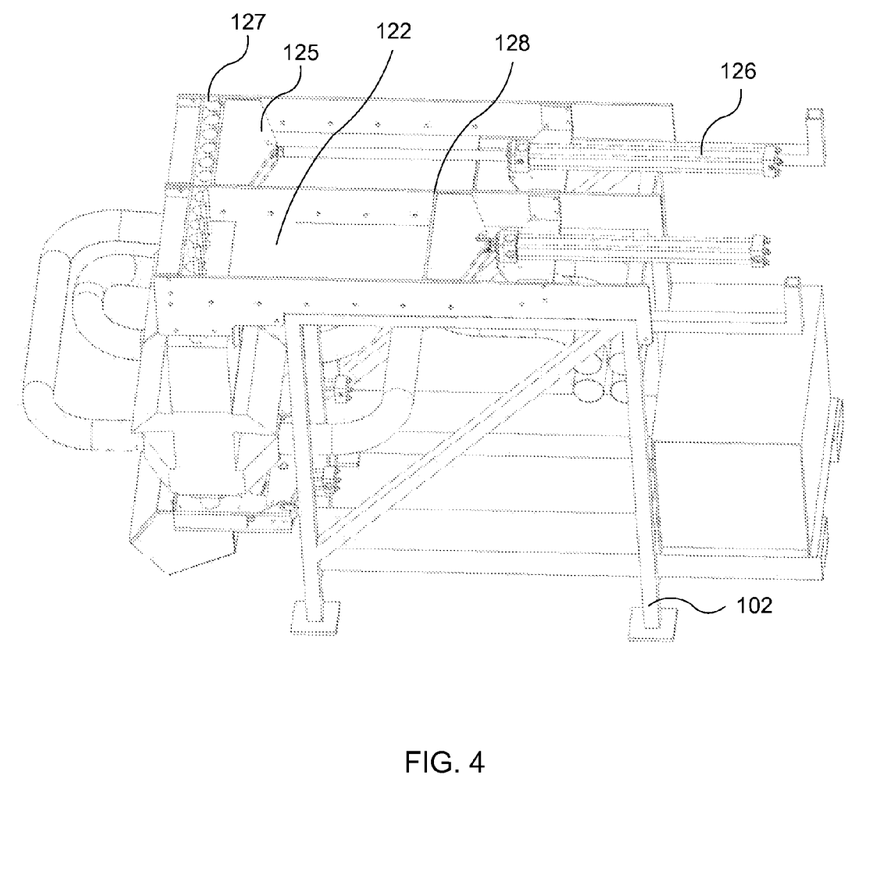
FIG. 4 is a top side view of a compactor in one embodiment of a carpet pellet machine.

In the illustrated embodiment, hopper 110 receives fibrous material and feeds it to one or more compaction chambers 122 in compactor 120. As shown in FIG. 4, compactor 120 then uses one or more hydraulics 126 to press a compacting head 125 having a plate 128 into the fibrous material and up against base plate 127. In the illustrated embodiment base plate 127 is contoured corresponding to pipes in mold pipe system 140, however other embodiments are not so limited. For example, base plate 127 may be a flat plate, a contoured or a sloped plate, or compactor 120 may just use a back wall of compaction chamber 122. Additionally, in some embodiments, plate 128 may also be contoured to contain fibrous material to be fed into mold pipe system 140 by hydraulic 136 and a compression ram or other compression mechanism.

Some embodiments may operate without a compactor 120 or a hopper 110. In another embodiment, compactor 120 may reside within or be integral to hopper 110. For example, hopper may be bounded on all sides other than an entry portion and an exit where the exit is coupled with mold pipe system 140 or an alternate shaped molding system and hopper may have a compactor that substantially bounds the entry portion side of fibrous material to allow compression of the fibrous material that may then be fed to the mold pipe system 140 or other alternate shaped molding system.

Figure 5:
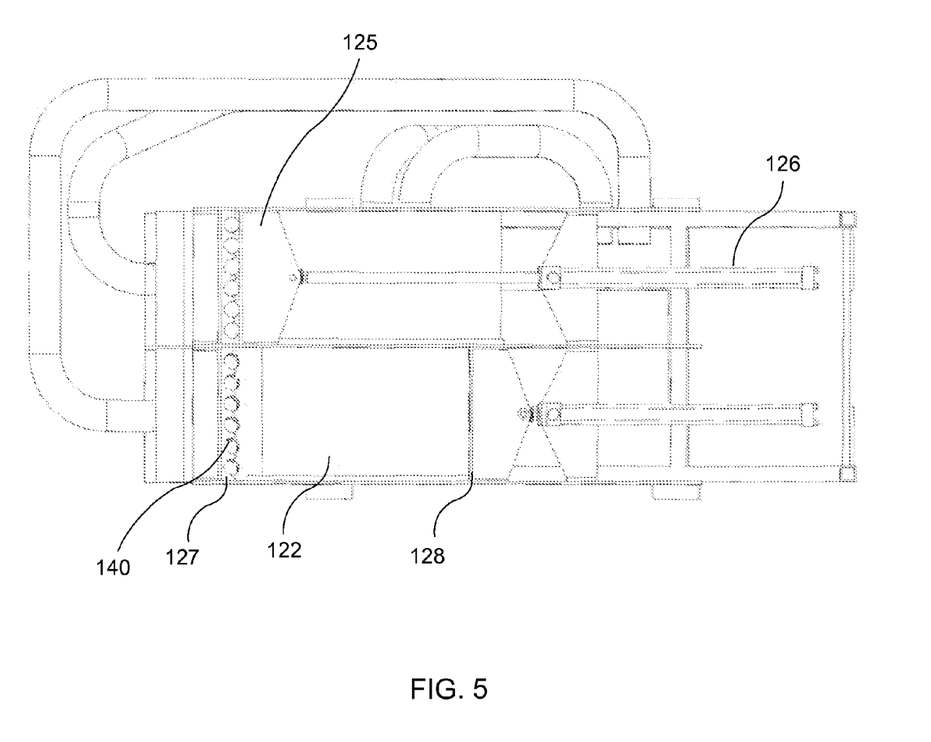
FIG. 5 is a top view of a compactor in one embodiment of a carpet pellet machine.

FIG. 5 is a top view of the compactor 120 of carpet pellet machine 100. In this embodiment compactor has two hydraulics 126 that each operate a compacting head 125 to compress fibrous material between a plate 128 of compacting head 125 and a base plate 127. For example, on the top portion of compactor 120 as illustrated in FIG. 2, the compactor is shown in a compacted position yet allowing openings for each of the pipes in mold pipe system 140. In this way, a compression ram can push into the compacted fibrous material and feed it into mold pipe system 140.

As the compacted fibrous material is under increasing pressure while the compactor 120 closes, the compactor does not necessarily have to close entirely for the compression ram 130 to be able to feed the compressed fibrous material into mold pipe system 140. For example, compactor 120 may have a shorter cycle range or compression ram may begin pressing into the compacted fibrous material prior to the compactor 120 being in a fully compacting position. In some embodiments, the compression ram 130 and the compactor 120 timing may be adjusted to allow for a range of fibrous materials. In this way, if a fibrous material may be sufficiently fed into mold pipe system 140, then the timing of compression ram 130 can be adjusted to start compressing prior to compactor 120 being extended in a fully compacting position. Or, alternatively, if fibrous material requires more compaction to be able to be fed at a desired rate into mold pipe system 140, then the timing can be adjust to have compression ram 130 start compressing later in the compacting cycle of compactor 120 or even start while the compactor 120 is in a fully extended position.

In some embodiments, the compactor 120 and compression ram 130 can be coordinated to adjust a feed rate of fibrous material through mold pipe system 140. In this way, the feed rate can be adjusted to control the heating time and therefore encapsulation layer 240 depth of the resulting bonded fibrous material. Additionally, the coordination of compactor 120 and compression ram 130 may be computer controlled to adjust heating time, process fibrous materials of different composition, etc.

In the embodiment illustrated in FIG. 5 the compactor 120 is shown with a planar bottom to compacting chamber 122, however other embodiments are not so limited. For example, if the compactor 120 and hopper 110 are in a combined unit, the geometry of compactor 120 may be dictated by the hopper 110 shape, by a contoured surface to better feed compression ram, etc.

Figure 6:
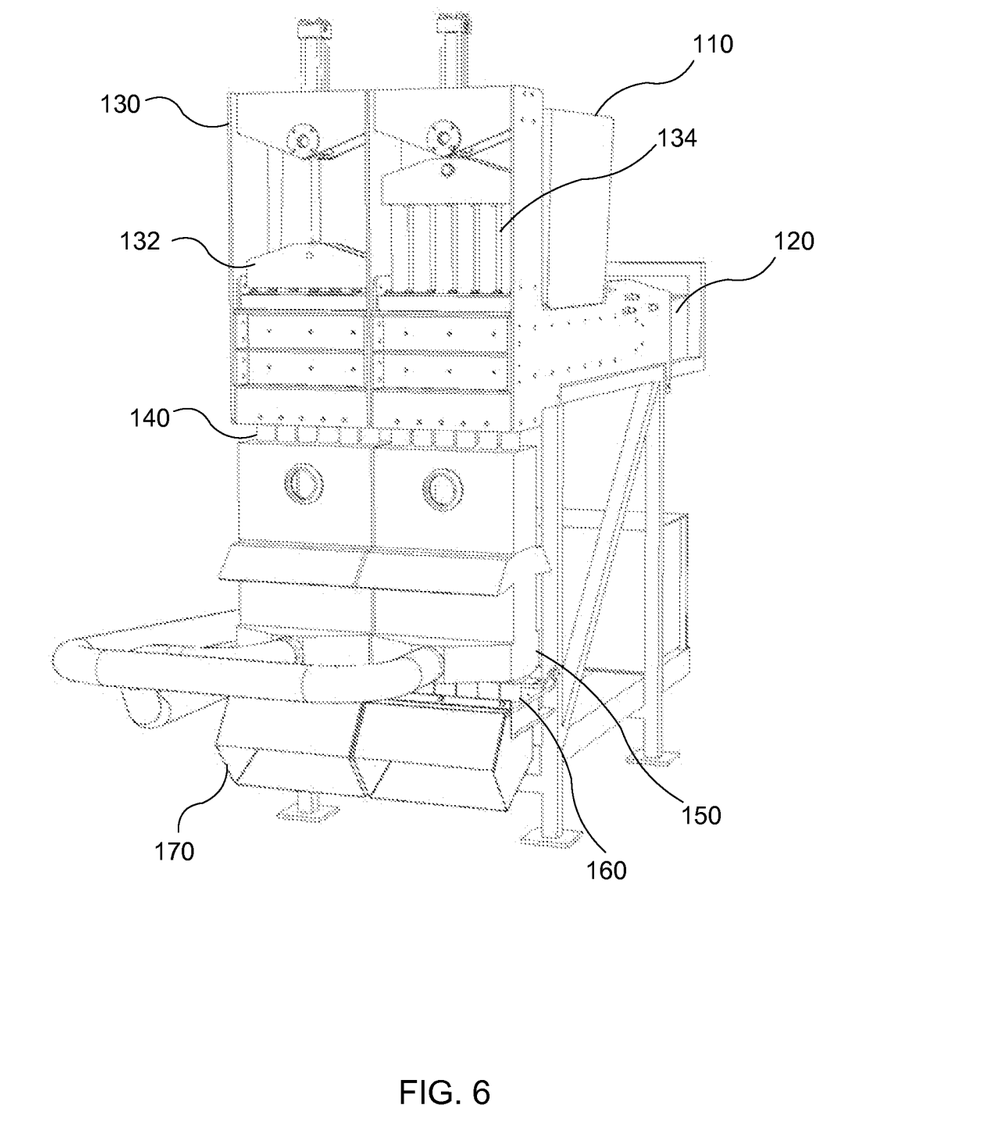
FIG. 6 is a front angled view of a compression ram, a mold pipe system, and a heating chamber in one embodiment of a carpet pellet machine.

FIG. 6 is a front angled view of a compression ram 130, a mold pipe system 140, and a heating chamber 150 in one embodiment of a carpet pellet machine. Compression ram 130 includes two ram heads 132 each with a plurality of ram rods 134 to compress fibrous material that has been compacted by compactor 120 into mold pipe system 140 to then be fed through heating chamber 150 and sizer 160. In the illustrated embodiment, compression ram 130 feeds the fibrous material through a vertical mold pipe system 140, but other embodiments are not so limited.

In this embodiment, compression ram 130 is a hydraulically operated compression ram, but other embodiments may use any suitable powering mechanism. As non-limiting examples, air may be used to power compression ram or to force fibrous material into mold pipe system directly, the compression ram may be cam driven, may be driven by an eccentric flywheel coupled with compression ram 130, etc.

In some embodiments, the compression ram 130 may be a multi-mode system. For example, the depth of ram penetration into the compactor 120 or into mold pipe system 140 may be adjusted. Additionally, in embodiments where the compression ram 130 extends into mold pipe system 140, the compression ram 130 may continue to feed fibrous material through mold pipe system 140 even when the compactor is no longer compacting. In this way the compactor 120 may be filling with more fibrous material while the compression ram 130 is controlling a feed rate of fibrous material through the heat chamber 150.

In some embodiments, the piston rams may have teeth for material capture. For example, each piston ram may have teeth around the front perimeter of the ram to help capture fibrous material to be fed into mold pipe system. In some embodiments, a cone may be attached to one or more piston rams to aid in material capture. Additionally, some cones may be spring actuated to provide clearance for the piston to fully enter the mold pipe system 140. Additionally, in some cases the cone can be designed to capture material but clear the outside of the end of the pipes in mold pipe system to not obstruct the compression ram 130 during compression.

In some embodiments the ram rods may have an adjustable tip. In this way they can be replaced due to wear, can be exchanged for different fibrous materials, can have different diameters or geometry and therefore can be coupled with a modular mold pipe system that can be interchanged with different geometries, diameters, etc.

Figure 7:
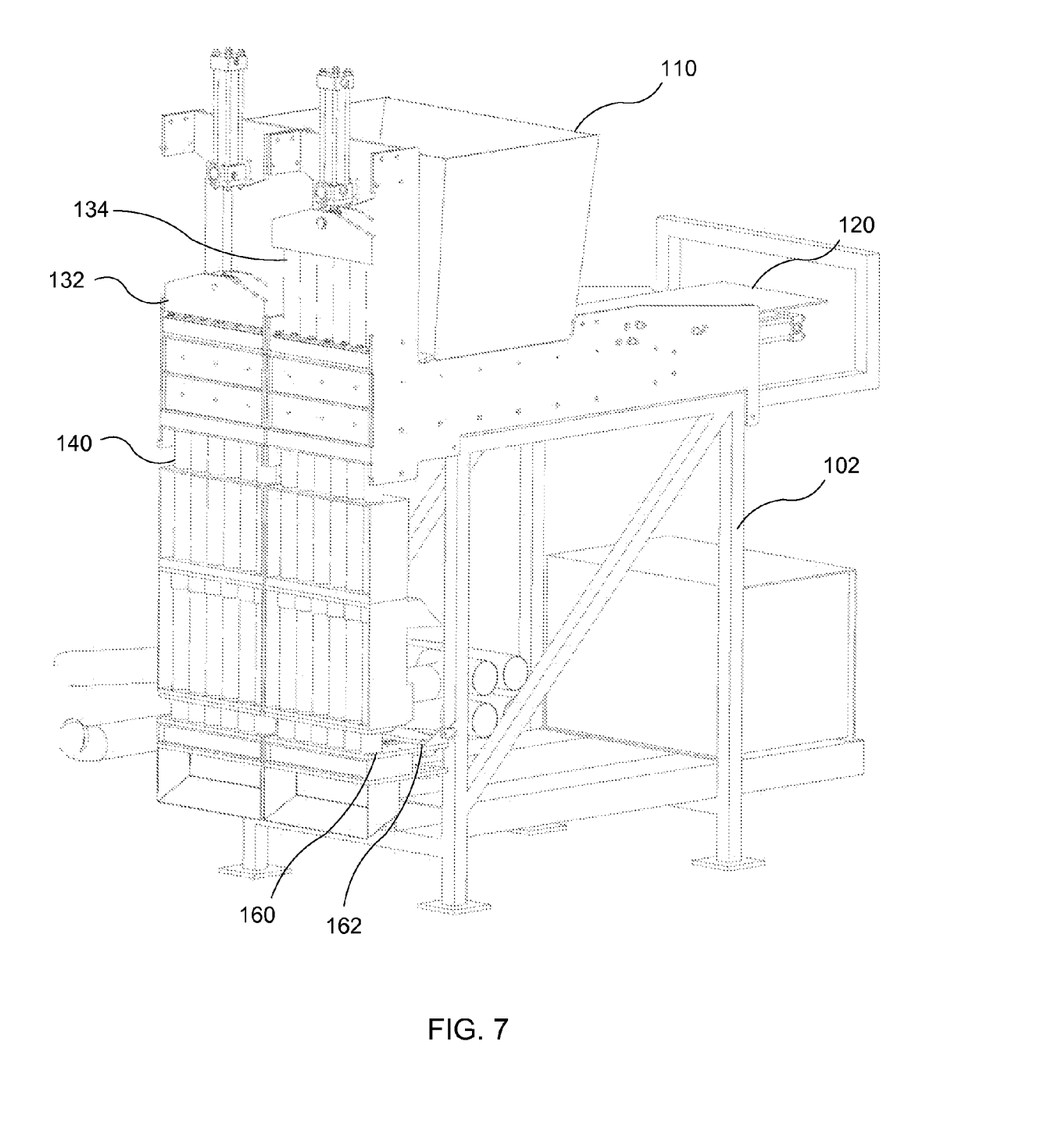
FIG. 7 is a front oblique view of a mold pipe system in an embodiment carpet pellet machine.

FIG. 7 shows a front oblique view of a mold pipe system 140 in an embodiment carpet pellet machine. In the illustration, mold pipe system 140 is shown including a plurality of pipes that extend from the compression rams 130 through the heating chamber 150 and to sizer 160. The illustrated embodiment includes 12 pipes, but other embodiments may use one pipe or a different plurality of pipes. Additionally, the illustrated embodiment shows the pipes extending beyond heating chamber 150, but other embodiments are not so limited. In an alternate embodiment, the pipes of mold pipe system 140 may also extend into compactor 120 and have an opening to receive fibrous material from compactor 120 and compression ram 130. For example, the pipes may extend into compactor but be cut in half so the pipe material forms the base plate 127.

In some embodiments the diameter and length of pipe in the compression zone and/or the heating zone may be adjusted to control feed rate, cook time, compression amount, etc. Additionally, the pipes may not all be the same size, or may be interchangeable to allow for replacement with a larger or smaller diameter set of pipes. In some embodiments, the mold pipe system 140 may be modular to allow for replacement of all or a portion of pipes at once.

Figure 8:
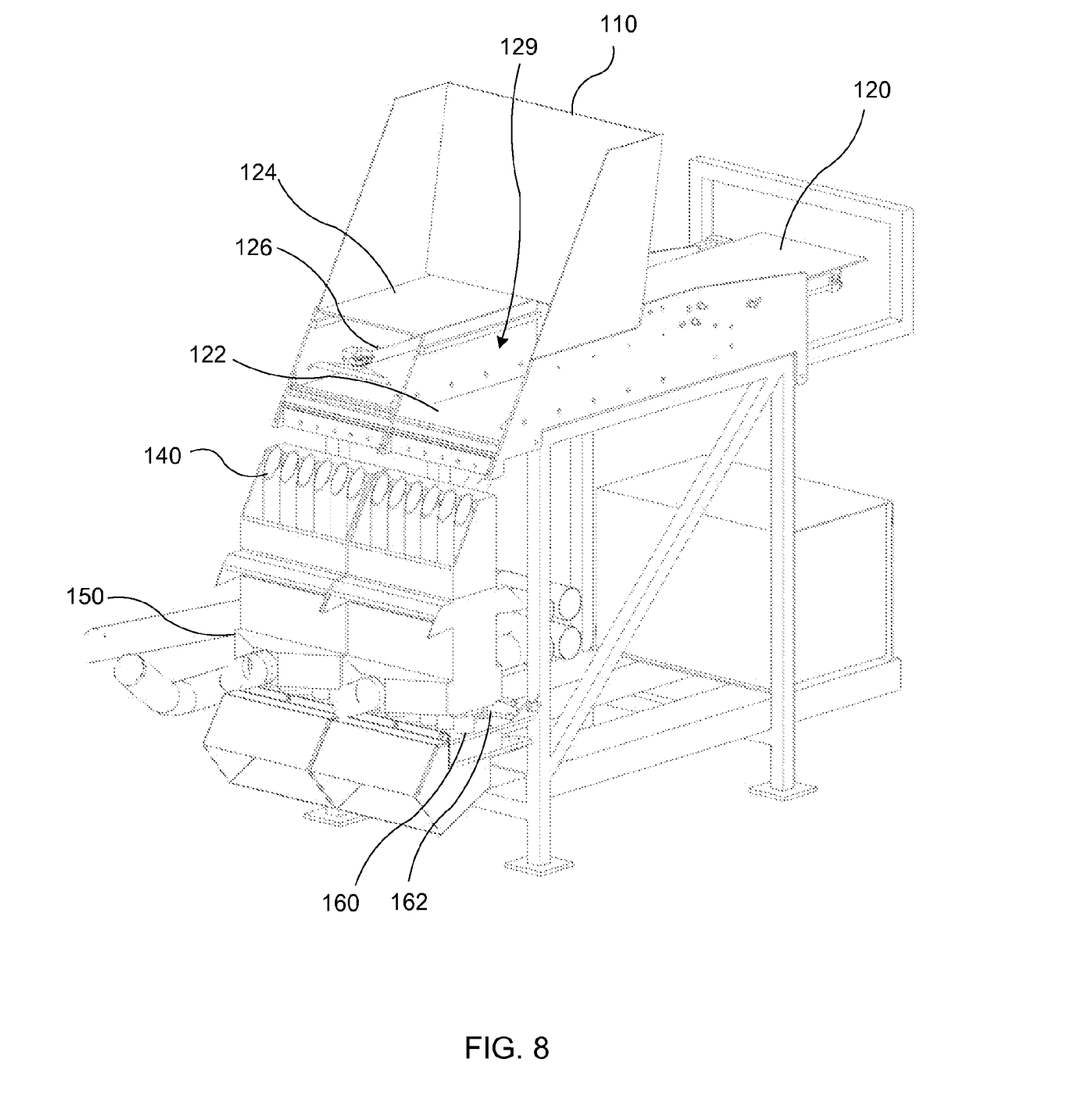
FIG. 8 is an oblique view with an angled cross-section of a hopper, a compactor, and a mold pipe system in an embodiment carpet pellet machine.

In the illustrated embodiment, sizer 160 uses a reciprocating breaker plate 162 to size bonded fibrous material exiting the heating chamber 150. In some embodiments, breaker plate 162 may have one or more holes that coordinate with pipes in mold pipe system 140 to allow segments of bonded fibrous material to pass through before breaking them into small sized segments. In other embodiments carpet pellet machine may use a cutting sizer or other suitable sizers or may operate without a sizer and generate generally bulk bonded fibrous material. FIG. 8 shows an oblique view with an angled cross-section of a hopper, a compactor, and a mold pipe system in an embodiment carpet pellet machine.

Figure 9:
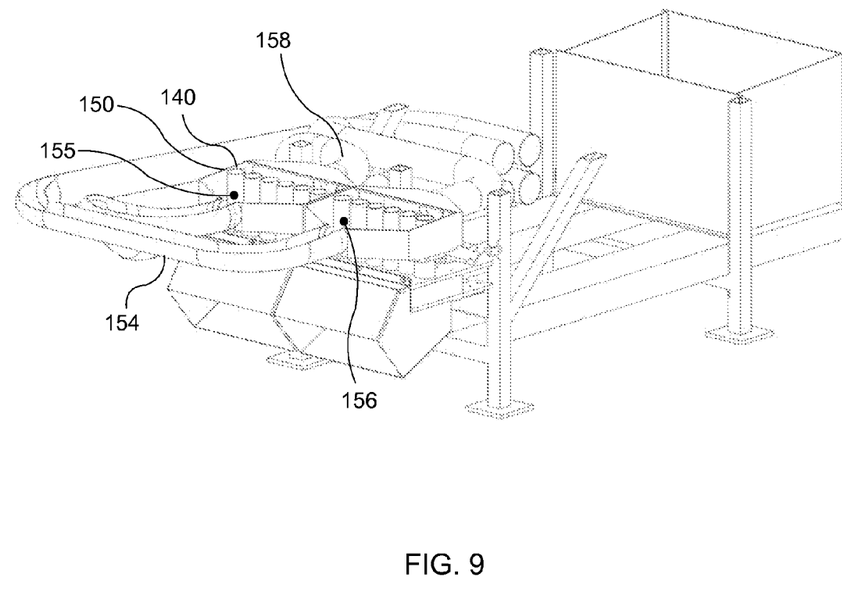
FIG. 9 is an oblique view with a cross-section of a heating chamber in an embodiment carpet pellet machine.

FIG. 9 shows an oblique view with a cross-section of a heating chamber 150 in an embodiment carpet pellet machine. The illustrated embodiment includes input pipes 154 and exit pipes 158 to channel a hot working fluid into heating chambers 155 and 156 that pipes 140 extend through. For example, the hot working fluid may be a hot oil bath. In other embodiments the heating chamber may user a steam heat exchanger, an inductor, a fibrous material burner, an exhaust heat exchanger, flame, etc. Embodiments may use radiant heating, conductive heating or convective heating on mold pipe system. An exhaust heat exchanger embodiment would allow a portable carpet pellet machine that may use diesel engine or other engine exhaust to heat the heating chamber.

In the illustrated embodiment the heating chamber surrounds the pipes in mold pipe system 140, but other embodiments are not limited in this way and the heating chamber can only partially intersect with pipes in mold pipe system 140. In some embodiments the heating chamber may be within mold pipe system 140, for example, an inductor may be coupled with the outside of mold pipe system and heat the pipe directly and create a heating chamber within the mold pipe system.

Figure 10:
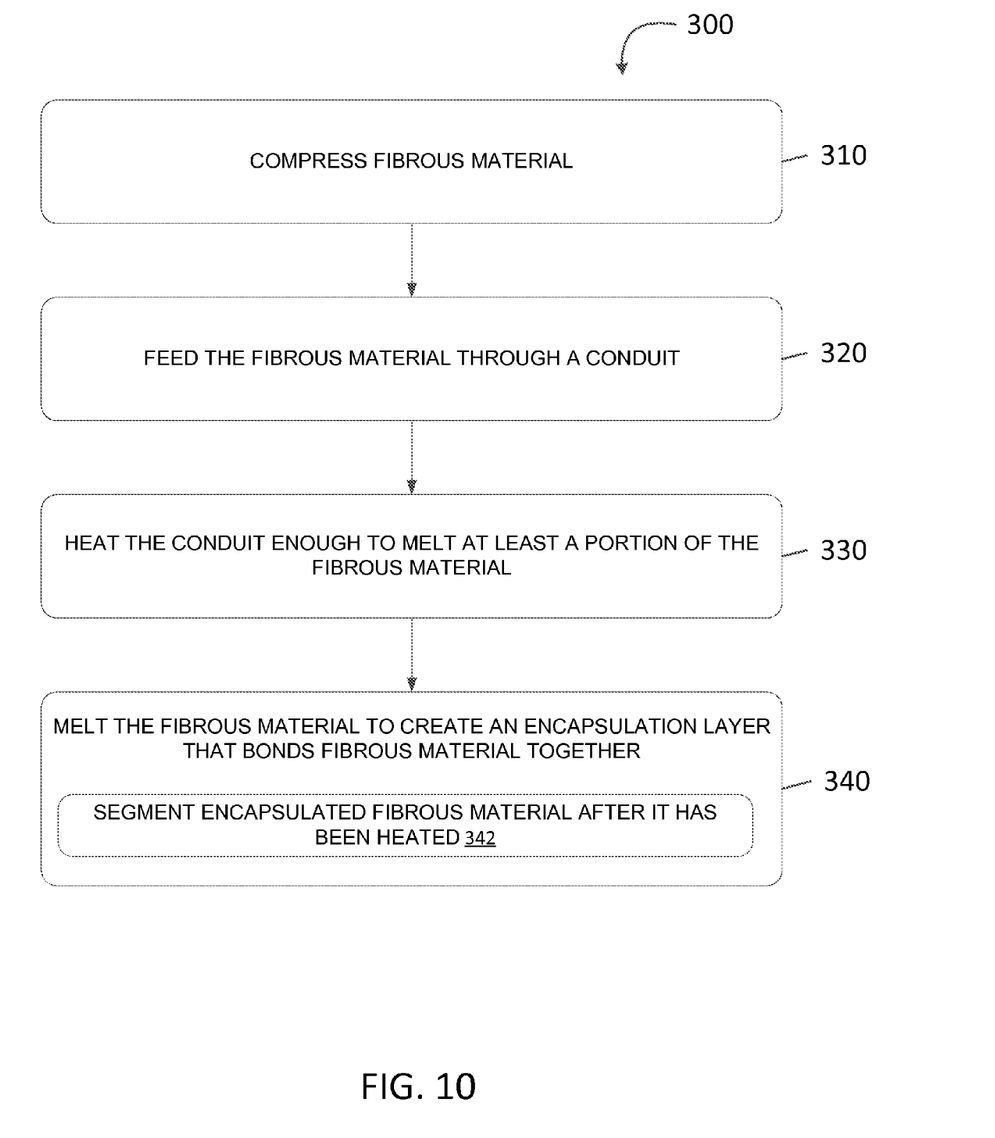
FIG. 10 is a flow diagram of one embodiment method to encapsulate fibrous material.

FIG. 10 is a flow diagram of one embodiment method 300 to encapsulate fibrous material, such as shredded carpet fibers. Block 310 in the illustrated example includes compressing fibrous material. Then in block 320, method 300 includes feeding the fibrous material through a conduit. Block 330 involves heating the conduit enough to melt at least a portion of the fibrous material. Then in block 340, the fibrous material is melted to create an encapsulation layer that bonds fibrous material together. In some embodiments, method 300 may further comprise segmenting encapsulated fibrous material after it has been heated. In some embodiments, method 300 may further comprise compacting loose fibrous material prior to compressing the fibrous material. Additionally, method 300 may include other aspects of this disclosure, for example those described in conjunction with carpet pellet machine 100 and other disclosed embodiments.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An apparatus comprising:
   a compressor to receive fibrous material and compress the fibrous material;
   a mold pipe system to receive compressed fibrous material from the compressor, wherein the compressor is configured to press the fibrous material through the mold pipe system; and
   a heat chamber to heat the fibrous material within the mold pipe system and create an encapsulation layer on the fibrous material, wherein the encapsulation layer is a melted membrane comprising an outer layer of fibrous material, and the outer layer bonds together the fibrous material in the center of the mold pipe.

2. The apparatus of claim 1, further comprising a sizer to segment encapsulated fibrous material after it has passed through the heat chamber.

3. The apparatus of claim 1, further comprising a compactor to compact loose fibrous material to the compressor.

4. The apparatus of claim 1, further comprising a hopper to receive loose fibrous material to be provided to the compressor.

5. The apparatus of claim 1, wherein the heat chamber is within the mold pipe system and the heat is provided by an inductor.

6. The apparatus of claim 1, wherein the mold pipe system passes through a heat chamber that uses a hot working fluid to heat the mold pipe system.

7. The apparatus of claim 1, wherein the compressor includes a compression ram having one or more ram rods that compress fibrous material into mold pipe system.

8. The apparatus of claim 7, further including a compactor, wherein the compactor compacts fibrous material into a compaction chamber and the compression ram presses compacted fibrous material into the mold pipe system.

9. The apparatus of claim 1, wherein the encapsulation layer is formed circumferentially around the fibrous material where the fibrous material contacts the mold pipe system.

10. A method comprising:

compressing fibrous material;

feeding the fibrous material through a conduit;

heating the conduit enough to melt at least a portion of the fibrous material; and melting the fibrous material to create an encapsulation layer, wherein the encapsulation layer is a melted membrane comprising an outer layer of the fibrous material, and the outer layer binds the fibrous material in the center of the mold pipe.

11. The method of claim 10, further comprising segmenting encapsulated fibrous material after it has been heated.

12. The method of claim 10, further comprising compacting loose fibrous material prior to compressing the fibrous material.

* * * * *